United States Patent [19]
Aoki

[11] Patent Number: 5,313,328
[45] Date of Patent: May 17, 1994

[54] OPTICAL SYSTEM COMPRISING GRADED REFRACTIVE INDEX LENS ELEMENT

[75] Inventor: Norihiko Aoki, Tokyo, Japan

[73] Assignee: Olympus Optical Co., Ltd., Tokyo, Japan

[21] Appl. No.: 882,254

[22] Filed: May 8, 1992

Related U.S. Application Data
[63] Continuation of Ser. No. 514,546, Apr. 26, 1990, abandoned.

[30] Foreign Application Priority Data
Apr. 27, 1989 [JP] Japan ................................. 1-105940

[51] Int. Cl.⁵ .......................... G02B 9/10; G02B 15/14
[52] U.S. Cl. ................................... 359/654; 359/684; 359/687; 359/692
[58] Field of Search .............. 350/413, 423, 427, 469; 359/652–654, 676, 686, 687, 688–692, 684

[56] References Cited
U.S. PATENT DOCUMENTS
| | | | |
|---|---|---|---|
| 4,776,679 | 10/1988 | Kitagishi et al. | 350/413 |
| 4,976,521 | 12/1990 | Ishii et al. | 350/413 |
| 4,998,807 | 3/1991 | Uzawa et al. | 359/654 |
| 5,011,272 | 4/1991 | Nakayama et al. | 359/653 |
| 5,054,898 | 10/1991 | Kitagishi et al. | 359/654 |

FOREIGN PATENT DOCUMENTS
61-172110 8/1986 Japan .
61-248015 11/1986 Japan .
62-153909 7/1987 Japan .

*Primary Examiner*—Bruce Y. Arnold
*Assistant Examiner*—James Phan
*Attorney, Agent, or Firm*—Cushman, Darby & Cushman

[57] ABSTRACT

An optical system comprising a plural number of lens elements at least one of which is designed as a graded refractive index lens element having refractive index distribution in the radial direction, and has aberrations favorably corrected in said optical system as a whole by making most of the correcting functions of the graded refractive index lens element for Petzval's sum and chromatic aberration.

7 Claims, 7 Drawing Sheets

1st LENS UNIT   2nd LENS UNIT   3rd LENS UNIT   4th LENS UNIT

FRONT LENS UNIT   REAR LENS UNIT

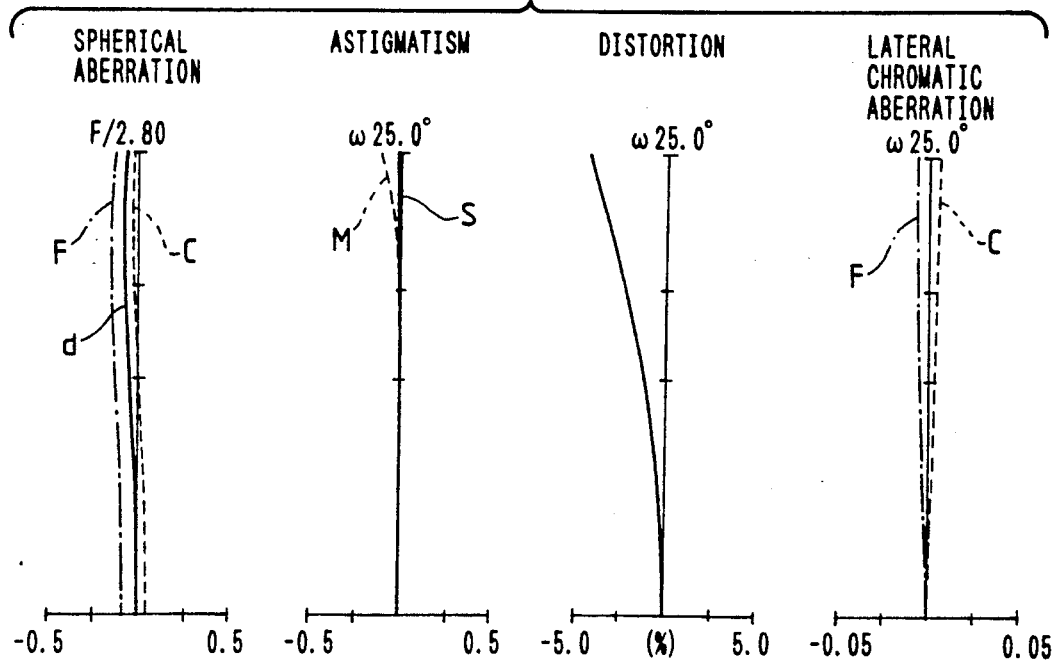
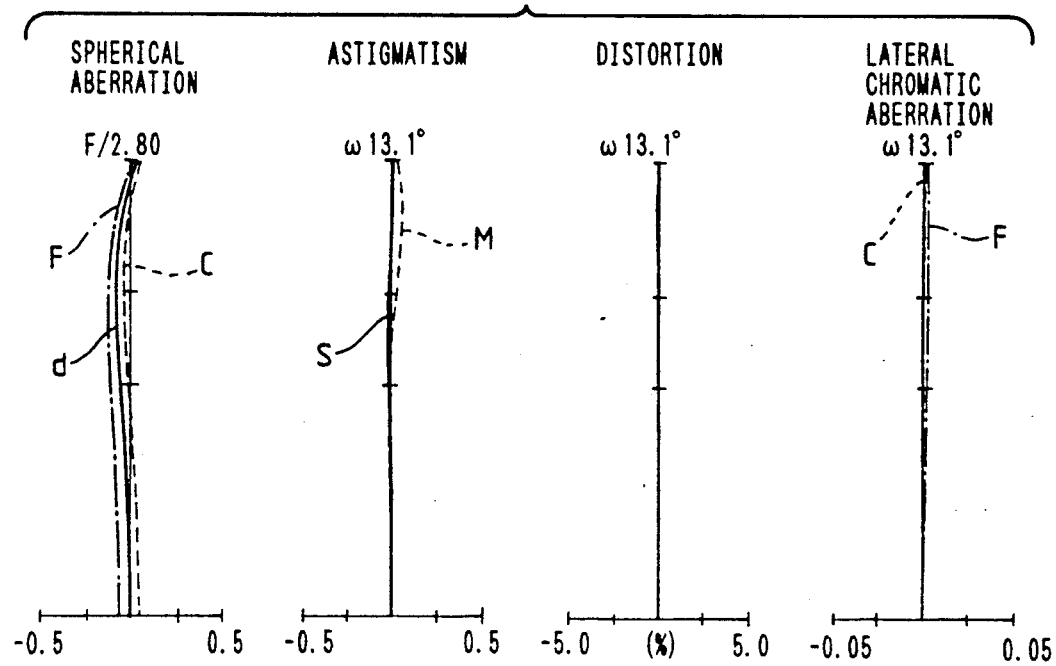

OPTICAL SYSTEM COMPRISING GRADED REFRACTIVE INDEX LENS ELEMENT

This is a continuation of application Ser. No. 07/514,546, filed on Apr. 26, 1990, now abandoned.

BACKGROUND OF THE INVENTION a) Field of the invention

The present invention relates to an optical system which comprises graded refractive index lens element having refractive index distribution in the direction perpendicular to the optical axis.

b) Description of the prior art

Since light weight, and compactness are now demanded in combination with higher specifications for optical systems along with compact designs of electrical systems and mechanical systems used in various types of optical instruments, it is becoming difficult to design optical systems satisfying such demands only with homogenous spherical lens elements. Though there are known optical systems which use aspherical lens elements, no optical systems have not succeeded yet in overcoming the above-mentioned difficulty.

Under the circumstances described above, attention has recently been paid to optical systems in which graded refractive index lens elements are adopted.

Graded refractive index lens elements (GRIN lens elements) are classified, dependently on directions of refractive index distributions, into axial type which has refractive index distribution in the direction along the optical axis, radial type which has refractive index distribution in the direction perpendicular to the optical axis, and so on. Out of these types of GRIN lens elements, the radial type has excellent properties especially for correcting Petzval's sum and chromatic aberration.

Japanese Patent Kokai Publication No. 62-153909 discloses an optical system which uses a GRIN lens element mainly for correcting Petzval's sum. However, this publication makes no sufficient disclosure on the other property to correct chromatic aberration.

SUMMARY OF THE INVENTION

A primary object of the present invention is to provide an optical system which comprises at least one graded refractive index lens element, and has favorably corrected Petzval's sum, chromatic aberration, etc.

The optical system according to the present invention comprises a plural number of lens elements including at least one graded refractive index lens element having refractive index distribution in the radial direction. Said graded refractive index lens element is designed so as to have the distribution profile expressed by the following formula (1) and satisfy the condition (2) shown below:

(1) $\quad n(r) = n_0 + n_1 r^2 + n_2 r^4 + n_3 r^6 + \ldots$
(2) $\quad 0 < \nu 1_d$ wherein the reference symbol $n_0$ represents a refractive index of the graded refractive index lens element as measured on the optical axis, the reference symbol $r$ designates a distance as measured from the optical axis in the radial direction, the reference symbol $n(r)$ denotes a refractive index as measured at a point located at the distance $r$ from the optical axis, the reference symbols $n_1, n_2, n_3, \ldots$ represent the coefficients of second order, fourth order, sixth order, ... respectively in the formula of refractive index distribution, and the reference symbol $\nu 1_d$ designates a value determined according to the formula of refractive index distribution by using the coefficients of the second order for the d-line, F-line and C-line $n1_d$, $n1_F$ and $n1_C$ as follows:

$$\nu 1_d = n 1_d / (n 1_F - n 1_C)$$

Now description will be made on Petzval's sum and chromatic aberration of a radial GRIN lens element.

Petzval's sum of a single GRIN lens element is expressed by the following formula:

$$\phi_S / n_0 + \phi_M / n_0^2$$

Further, the longitudinal chromatic aberration of a single GRIN lens element is expressed by the following formula:

$$\phi_S / \nu 0_d + \phi_M / \phi 1_d = 0$$

In each of the two formulae mentioned above, the reference symbol $\phi_S$ represents a refractive power of surface, the reference symbol $\phi_M$ designates a refractive power of medium which is expressed as $\phi_M = 2n_1 d_G$ (the reference symbol $d_G$ represents thickness of the GRIN lens element as measured on the optical axis), and the reference symbol $\nu 0_d$ denotes an Abbe's number determined from refractive indices for the d-line, F-line and C-line as measured on the optical axis. As is understood from the above-mentioned formula, it is possible to make the Petzval's sum of a radial GRIN lens element far smaller than that of a homogenous lens element which has the same refractive power as that of the radial GRIN lens element, or zero the Petzval's sum of a radial GRIN lens element by selecting a sign of the refractive power of surface which is reverse to that of the refractive power of medium. Similarly, it is possible to make the longitudinal chromatic aberration of a radial GRIN lens element far smaller than that of a homogenous lens element which has the same refractive power of the radial GRIN lens element, or zero the longitudinal chromatic aberration of a radial GRIN lens element.

Furthermore, the aberration correcting effects of a radial GRIN lens element can be enhanced by increasing gradient in refractive index distribution.

On the other hand, checks of optical properties of the elements composing glass clarify that the graph of $n_d - \nu_d$ shows a distribution wherein the elements having high refractive indices $n_d$ have small Abbe's numbers $\nu_d$.

Since glass materials generally have the additive property, an attempt to manufacture a radial GRIN lens element having a high gradient in refractive index distribution will lead to obtain a GRIN lens element having a distribution wherein Abbe's number is reduced as refractive index is enhanced despite selection of elements. Such a GRIN lens element will have a value of $\nu 1_d$ which is larger than 0.

For the reason described above, the optical system according to the present invention adopts a radial GRIN lens element which satisfies the above-mentioned condition (2).

If the lower limit of the condition (2) is exceeded, the radial GRIN lens element will have a distribution wherein Abbe's number is enlarged as refractive index is enhanced and can hardly be manufactured.

In order to correct chromatic aberration by medium of the radial GRIN lens element, it is desirable, as judged from the above-mentioned formula for correction of chromatic aberration, that the said GRIN lens element is designed so as to satisfy the following condition (3):

$$\nu 1_d < \nu 0_d \qquad (3)$$

If the upper limit of condition (3) is exceeded, on the other hand, it will be impossible to favorably correct the chromatic aberration produced by the medium of the GRIN lens element.

BRIEF DESCRIPTION OF THE DRAWINGS

FIG. 5 through FIG. 7 show curves illustrating aberration characteristics of the Embodiment 1 of the present invention;

DETAILED DESCRIPTION OF THE PREFERRED EMBODIMENTS

Now, the present invention will be described more detailedly with reference to the preferred embodiments illustrated in the accompanying drawings.

Figure 1:
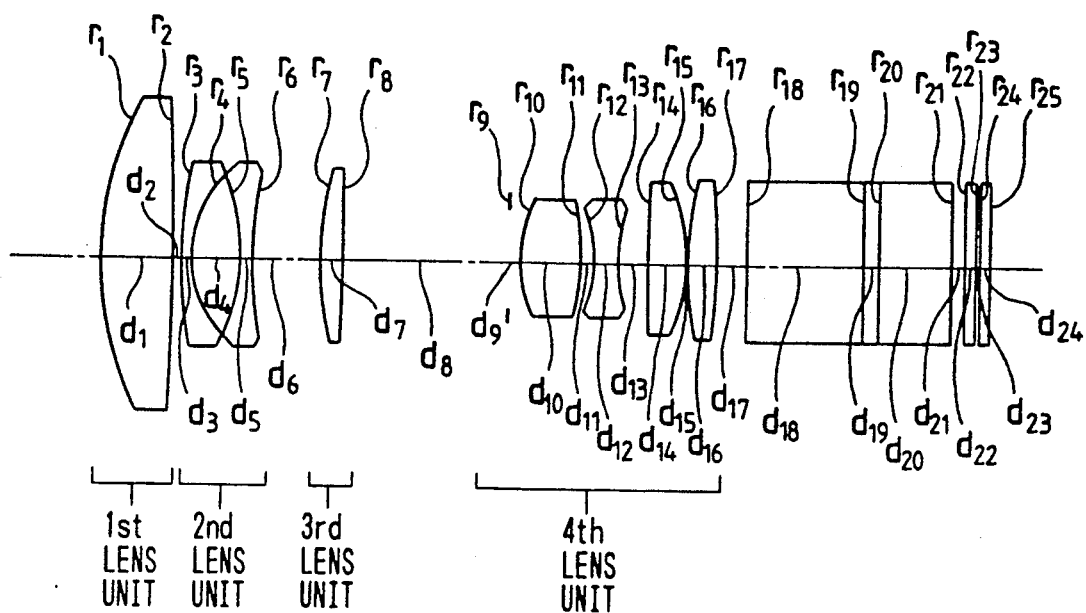
FIG. 1 through FIG. 4 show sectional views illustrating Embodiments 1 through 4 of the optical system according to the present invention.

FIG. 1 shows a sectional view illustrating composition of the Embodiment 1 of the optical system according to the present invention.

The Embodiment 1 is an example wherein a lens unit having positive refractive power is composed of a single GRIN lens element. This GRIN lens element has a positive refractive power of surface, a strongly negative refractive power of medium, and a positive refractive power as a whole, and is designed so as to satisfy the above-mentioned condition (2).

The optical system preferred as the Embodiment 1 of the present invention is designed as a zoom lens system which comprises, in the order from the object side, a first lens unit which has a positive refractive power and is kept stationary during variation of focal length, a second lens unit which has a negative refractive power, is movable during variation of focal length and serves mainly for variation of focal length, a third lens unit which is movable during variation of focal length and has a function to maintain image point constant, a stop, and a fourth lens unit which has a positive refractive power and is movable for variation of focal length, said first lens unit having the positive refractive power being designed as a radial GRIN lens element.

It is generally desirable for a zoom lens system that chromatic aberration is corrected independently in each lens unit thereof. For this reason, each lens unit is generally consists of two or more lens elements. Especially, a negatie meniscus lens element which requires very delicate polishing is used for correcting chromatic aberration in the first lens unit having a positive refractive power and constitutes a cause to enhance manufacturing cost of a zoom lens system.

In the Embodiment 1 of the present invention, the negative meniscus lens element used in the first lens unit of the conventional zoom lens system is omitted and the first lens unit of the Embodiment 1 is composed only of a single radial GRIN lens element.

In a zoom lens system such as the Embodiment 1 of the present invention, the aberrations posing problems in the first lens unit are chromatic aberration and spherical aberration which is produced at the tele position of the zoom lens system. In order to correct these aberrations, the first lens unit is generally composed of a single meniscus lens element and a single positive lens element or a plural number of positive lens elements. In order to correct these aberrations with a single radial GRIN lens element having the rolls of the above-mentioned lens elements, it is desirable to design the radial GRIN lens element so as to have a convex shape or a positive refractive power of surface, a negative refractive power of medium and positive refractive power as a whole. The reason for such design is that the longitudinal chromatic aberration is correctable with a single radial GRIN lens element, as judged from the formula for correction of the longitudinal chromatic aberration, only when the refractive power of surface has a sign reverse to that of the refractive power of medium since the Abbe's number $\nu 0_d$ calculated from the refractive index $n_0$ of the radial GRIN lens element as measured on the optical axis is larger than 0 and $\nu 1_d$ is also larger than 0 as defined by the condition (2). Accordingly, it is desirable that the radial GRIN lens to be used in a zoom lens system such as the Embodiment 1 of the present invention is designed so as to satisfy the following condition (4):

$$\phi_S \cdot \phi_M < 0 \qquad (4)$$

If the upper limit of the condition (4) is exceeded, the radial GRIN lens element will have the refractive power of surface and the refractive power of medium which have the same sign, and cannot correct the chromatic aberration independently by itself.

Further, when the surface of the radial GRIN lens element has a positive refractive power, negative spherical aberration is produced by the surface. Furthermore, when the radial GRIN lens element has a negative refractive power for correcting the longitudinal chromatic aberration, the refractive index of the interior of the radial GRIN lens element is enhanced as the lens portions are farther from the optical axis in the direction perpendicular to the optical axis, and negative spherical aberration is produced by the correcting term of the refractive index distribution formed on the surface thereof whereas positive spherical aberration is produced by the medium thereof. In order to correct the spherical aberration which is apt to be negative in the zoom lens system as a whole, it is necessary to cancel the negative spherical aberration with the positive spherical aberration by increasing the positive spherical aberration to be produced by the medium of the radial GRIN lens element. Even in a case where a refractive power of medium of a certain value is to be obtained, it is more effective for producing positive spherical aberration not to enlarge the coefficient of the second order $n_1$ in the formula of refractive index distribution but to increase thickness of the radial GRIN lens element as measured on the optical axis.

In order to compose the first lens unit of a single radial GRIN lens element, and correct the chromatic aberration and spherical aberration simultaneously in a zoom lens system such as the Embodiment 1 of the present invention, it is desirable for the reason described above to design the radial GRIN lens element so as to satisfy the following conditions (5) and (6):

$$5 \times 10^{-2} < d_G/f_W \tag{5}$$

$$0 < n_{1d}(f_W)^2 < 5 \tag{6}$$

wherein the reference symbol $d_G$ represents thickness of said radial GRIN lens element as measured on the optical axis, the reference symbol $n_{1d}$ designates the coefficient of the second order for the d-line in the formula of refractive index distribution and the reference symbol $f_W$ denotes focal length of the zoom lens system as a whole at the wide position thereof.

If the lower limit of the condition (5) is exceeded, it will be necessary to enhance the refractive power of medium of the radial GRIN lens element by enlarging the coefficient of the second order n: in the formula of refractive index distribution, whereby the negative spherical aberration produced by the surface and due to the refractive index distribution formed on the surface will be too remarkable for correction.

If the lower limit of the condition (6) is exceeded, the radial GRIN lens element will have a positive refractive power of medium which has the same sign as that of the refractive power of surface thereof, thereby being incapable of correcting the chromatic aberration independently by itself. Further, if the upper limit of the condition (6) is exceeded, in contrast, the coefficient of the second order in the formula of refractive index distribution greatly contributes to the refractive power of medium of the radial GRIN lens element, whereby the negative spherical aberration produced by the surface of the radial GRIN lens elemnt and due to the refractive index distribution formed on the surface will be too remarkable for correction by the medium of the radial GRIN lens element.

Moreover, when a single radial GRIN lens element has the same refractive power as that of the first lens unit of a zoom lens system composed only of homogenous lens elements, the refractive power of medium has the sign reverse to that of the refractive power of surface and the radial GRIN lens element must have a refractive power of surface stronger than the refractive power of a homogenous lens element as is clear from the formula of Petzval's sum. When the radial GRIN lens element has such a refractive power of surface, the first lens unit composed only of the radial GRIN lens element has a Petzval's sum larger than that of the first positive lens unit of the zoom lens system composed only of homogenous lens elements. However, a zoom lens system having a high vari-focal ratio tends to have a negative Petzval's sum especially at the tele position thereof. This negative Petzval's sum can be corrected by the radial GRIN lens element used as the first lens unit so as to maintain Petzval's sum of the zoom lens system as a whole at a favorable level.

In order to obtain the refractive power of surface of the radial GRIN lens element having the sign reverse to that of the refractive power of medium thereof and a positive refractive power of the radial GRIN lens element as a whole, it is sufficient to select a concave surface for the radial GRIN lens element so as to have a negative refractive power of surface and impart a positive refractive power to the medium thereof so as to obtain a positive refractive power of the radial GRIN lens element as a whole. Such a radial GRIN lens element will have too high a refractive index gradient and can hardly be manufactured. Further, this radial GRIN lens element has a positive Petzval's sum smaller than that of the first positive lens unit composed only of homogenous lens elements, thereby further enlarging absolute value of the negative Petzval's sum of the zoom lens system as a whole.

From the reason described above, the Embodiment 1 adopts as the first lens unit a radial GRIN lens element which has the positive refractive power of surface, the negative refractive power of medium and the positive refractive power as a whole. Further, by designing this radial GRIN lens element so as to satisfy the conditions (4), (5) and (6) in addition to the condition (2) for making most of the capability of the radial GRIN lens element to correct Petzval's sum and chromatic aberration, the Embodiment 1 is designed as a zoom lens system having favorable performance and comprising the first lens unit composed only of a single lens element.

Figure 2:
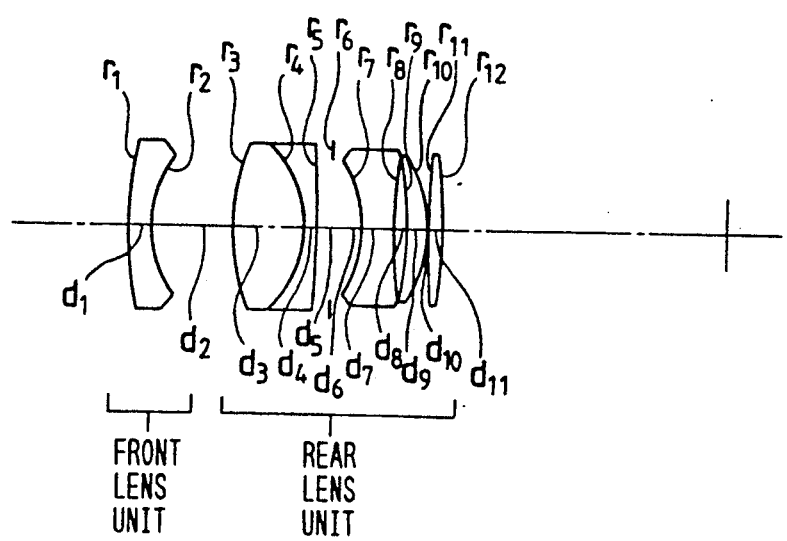

The Embodiment 2 of the present invention is an optical system having the composition illustrated in FIG. 2 wherein a retrofocus type wide-angle lens system consists of a front lens unit having a negative refractive power and a rear lens unit having a positive refractive power.

In this embodiment, the front lens unit having negative refractive power is composed only of a single radial GRIN lens element. The radial GRIN lens element used in the Embodiment 2 has a negative refractive power of surface, a positive refractive power of medium and a negative refractive power as a whole, and is designed so as to satisfy the condition (2).

In a lens system of this type, it is conventionally necessary to use at least one positive lens element and a negative lens element for correcting chromatic aberration independently in each of the front lens unit and the rear lens unit, and for correcting the offaxial aberration. Further, the offaxial ray has a large angle of incidence on the front lens unit having a negative refractive power in the lens system of this type. When the front lens unit on which the offaxial ray has the large angle of incidence is composed of a large number of lens elements as described above, the offaxial ray is eclipsed by the marginal portions of the lens elements, airspaces, etc., thereby making it difficult to obtain a sufficient amount of marginal ray. In order to obtain a sufficient amount of the marginal ray, it is necessary to thicken the front lens unit and widen the airspaces, thereby making it inevitable to prolong total length of the lens system and enlarge diameter of the front lens unit due to shift of the entrance pupil toward the image point. For the reason described above, it is desirable to compose the front lens unit having the negative refractive power of as small a number of lens elements as possible for reducing diameter of the front lens unit.

In the Embodiment 2, the front lens unit, which is conventionally composed of at least two homogenous lens elements for favorably correcting the chromatic aberration and the offaxial aberrations, consists of a single radial GRIN lens element having the refractive power of surface and the refractive power of medium described above.

The radial GRIN lens element used in the Embodiment 2 also satisfies the condition (2).

In a retrofocus type lens system such as the Embodiment 2, correction of the offaxial aberrations pose the greatest problem. It is especially important to correct the negative distortion which is produced due to the power distribution peculiar to the retrofocus type lens systems.

In order to correct the offaxial aberration in such a lens system, it is generally sufficient to arrange the lens surfaces on which the offaxial ray is high concentrically with regard to a stop. In the Embodiment 2, the offaxial aberrations, especially the negative distortion, are corrected favorably by designing the radial GRIN lens element, i.e., the front lens unit, as a negative meniscus lens element having a convex surface on the object side which is advantageous for correction of the offaxial aberrations.

The negative meniscus lens element convex on the object side has a small radius of curvature on the image side surface thereof. Accordingly, the refractive index distribution formed on the image side surface has higher correcting function when the negative meniscus lens element is designed as a radial GRIN lens element. When a positive refractive power is imparted to the medium of the radial GRIN lens element, the refractive power distribution formed on the image side surface produces remarkable positive distortion thereby making it possible to correct the distortion in the lens system as a whole. A smaller radius of curvature on the image side surface of this radial GRIN lens element will increase the positive distortion to be produced by this surface or make it possible to zero the distortion in the lens system as a whole. However, the negative spherical aberration to be produced due to the refractive index distribution formed on the image side surface will be too remarkable for correction. This negative spherical aberration cannot be corrected simply by producing positive spherical aberration with the refractive index distributions of the medium of the radial GRIN lens element and the object side surface thereof. For this reason, it is not allowed to select too small a radius of curvature on the image side surface of the radial GRIN lens element for correcting aberrations favorably in the lens system as a whole.

In the Embodiment 2, it is desirable to select said radius of curvature within a range satisfying the following condition (7):

$$0.2 < r_I/f < 3 \tag{7}$$

wherein the reference symbol $r_I$ represents radius of curvature on the image side surface of said radial GRIN lens element and the reference symbol f designates focal length of the lens system as a whole.

If the lower limit of the condition (7) is exceeded, the radial GRIN lens element will have too small a radius of curvature on the image side surface thereof and the negative spherical aberration will be too remarkable for correction.

The radial GRIN lens element used in the Embodiment 2 has a refractive power of surface and a refractive power of medium which have signs reverse to each other, is designed so as to satisfy the condition (2), and capable of correcting the chromatic aberration independently by itself.

Further, it is desirable that the radial GRIN lens element used in the Embodiment 2 also satisfies the condition (4). Furthermore, the Petzval's sum to be produced by the radial GRIN lens element is located on the negative side as compared with the Petzval's sum to be produced by a homogenous lens element which has the same refractive power as that of the radial GRIN lens element, and can be corrected by properly selecting an adequate refractive index for the rear lens unit.

As is understood from the foregoing description, the Embodiment 2 is adapted so as to allow the radial GRIN lens element to fully exhibit the aberration correcting functions thereof by using the radial GRIN lens element in the front lens unit, and designing the radial GRIN lens element so as to have a negative refractive power of surface, a positive refractive power of medium and a negative refractive power as a whole, and satisfy the conditions (2), (4) and (7). This design makes it possible to compose the front lens unit having a negative refractive power in the retrofocus type lens system only of a single radial GRIN lens element.

Figure 3:
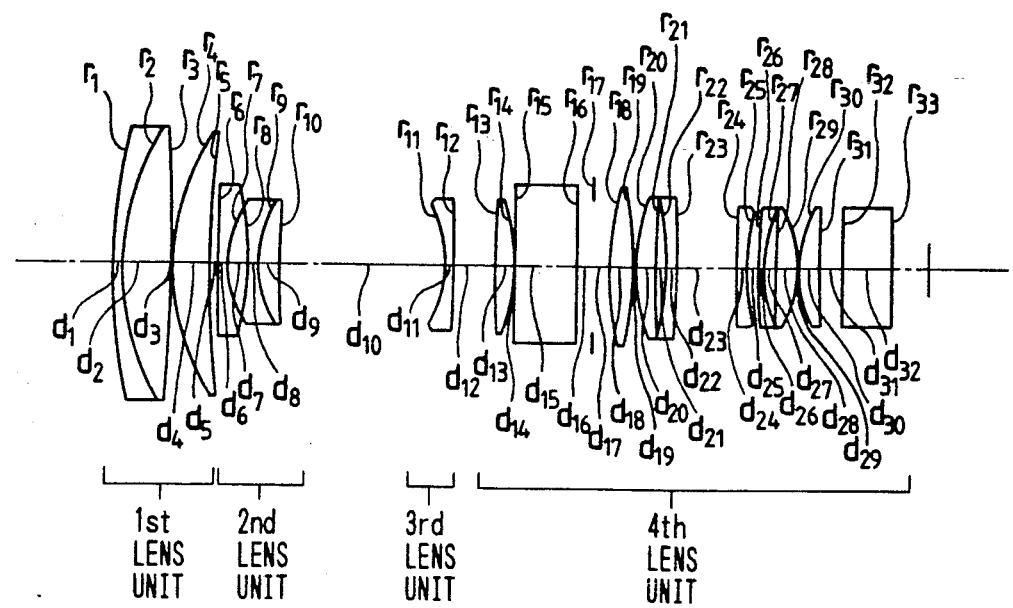

The Embodiment 3 of the present invention has the composition illustrated in FIG. 3, wherein a zoom lens system is composed, in the order from the object side, of a first positive lens unit which is kept stationary during variation of focal length, a second negative lens unit which is movable during variation of focal length and serves mainly for variation of focal length, a third negative lens unit which is movable during variation of focal length and serves for keeping the image point constant regardless of variation of focal length, and a fourth positive lens unit which is kept stationary during variation of focal length. A positive lens element comprised in the second negative lens unit is designed as a radial GRIN lens element. Speaking more concretely, the Embodiment 3 exemplifies a zoom lens system wherein a radial GRIN lens element having a positive refractive power of surface and a positive refractive power of medium, and designed so as to satisfy the condition (2) is used as a positive lens element in a lens unit having a negative refractive power as a whole.

For a zoom lens system consisting of four lens units, i.e., positive, negative, positive and positive lens units or positive, negative, negative and positive lens units, it is generally possible to obtain a high zooming ratio while maintaining a compact design of the zoom lens system by strengthening the refractive power of the second negative lens unit. In order to strengthening the refractive power of the second negative lens unit, aberrations, especially chromatic aberration, must be corrected independently in the second lens unit alone.

Correction of the chromatic aberration in the lens unit having the negative refractive power as a whole is performed by selecting glass materials having large Abbe's numbers for the negative lens elements and glass materials having small Abbe's numbers for the positive lens elements. Further, in order to obtain a zoom lens system having a high zooming ratio, the refractive power of the negative lens unit(s) contributing to variation of focal length must be strengthened. When the refractive power is strengthened, the longitudinal chromatic aberration produced on the negative side is aggravated. In order to correct this longitudinal chromatic aberration, it is sufficient to strengthen the refractive powers of the positive lens elements, reducing the Abbe's numbers of the positive lens elements or enlarging the Abbe's numbers of the negative lens elements. When the refractive powers of the positive lens elements are strengthened, however, the refractive powers of the negative lens elements must be further strengthened for obtaining the negative refractive power required for the lens unit, thereby producing a vicious cycle, and the adequate selection of Abbe's numbers for the positive and negative lens elements is difficult due to the restriction imposed on correction of the Petzval's sums and the restrictions imposed on practical selection of optical glass materials.

In order to obtain a high zooming ratio, the Embodiment 3 is adapted in such a manner that the refractive powers of the negative lens elements arranged in the second negative lens unit are strengthened and the chromatic aberration produced by the negative lens elements is corrected by producing spherical aberration having the reverse sign so as to correct the chromatic aberration in the zoom lens system as a whole without correcting the chromatic aberration independently by the radial GRIN lens element used as a positive lens element in the second negative lens unit. That is to say, the negative longitudinal chromatic aberration produced by strengthening the refractive power of the second negative lens unit is cancelled with the positive longitudinal aberration produced by using the radial GRIN lens element satisfying the condition (2) as a positive lens element and imparting a positive refractive power also to the medium thereof.

In order to impart a function for correcting chromatic aberration to said radial GRIN lens element, it is desirable to design the radial GRIN lens element so as to satisfy the following condition (8):

$$0 < \phi_S \cdot \phi_M \quad (8)$$

The condition (8) defines the sign of the refractive power of surface $\phi_S$ and the refractive power of medium $\phi_M$ respectively of the radial GRIN lens element.

If the lower limit of the condition (8) is exceeded, the refractive power of surface $\phi_S$ and the refractive power of medium $\phi_M$ will have signs reverse to each other, thereby making it impossible to produce the longitudinal chromatic aberrations on the same side.

When the zoom lens system is composed as described above, the Petzval's sum of the second negative lens unit having a negative value as a whole is further aggravated on the negative side by the radial GRIN lens element having the positive refractive power of medium which is used as a positive lens element. However, the composition facilitates correction of the chromatic aberration and enhances flexibility in selection of optical glass materials, thereby allowing to correct the Petzval's sum by enhancing the refractive indices of the negative lens elements.

As is understood from the foregoing description, the Embodiment 3 is adapted so as to correct the longitudinal chromatic aberration which is apt to be produced on the negative side in the lens unit having the negative refractive power by producing positive longitudinal chromatic aberration by both the surface and the medium of the radial GRIN lens element which is used as a positive lens element in the negative lens unit, has positive refractive powers of surface and medium, and is designed so as to satisfy the condition (2) and (8). As a result, the present invention has succeeded in obtaining the Embodiment 3 which is a zoom lens system having a zooming ratio enhanced by strengthening the refractive power of the second negative lens unit with the radial GRIN lens element.

The Embodiment 4 of the present invention is a zoom lens system wherein a lens unit having a positive refractive power as a whole comprises, as a negative lens element thereof, a radial GRIN lens element which has negative refractive powers of surface and medium respectively, and is designed so as to satisfy the condition (2).

Figure 4:
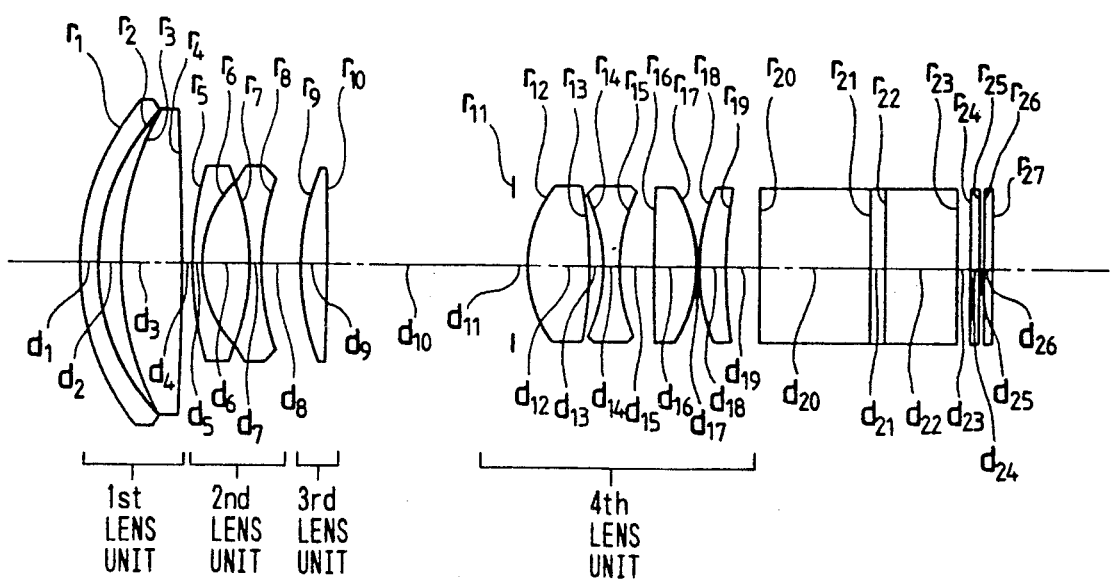

The Embodiment 4 has the composition illustrated in FIG. 4 wherein the zoom lens system consists, in the order from the object side, of a first positive lens unit which is kept stationary during variation of focal length, a second negative lens unit which is movable during variation of focal length and serves mainly for variation of focal length, a third positive lens unit which is movable for maintaining the image surface constant during variation of focal length, a stop, and a fourth positive lens unit which is movable for variation of focal length, a radial GRIN lens element being used as a negative lens element in the fourth positive lens unit.

In a general zoom lens system consisting of four lens units, spherical aberration is corrected mainly by the fourth lens unit, which is called a relay lens system, in the range from the wide position to the tele position. In order to obtain a zoom lens system having a small F number or a high aperture ratio, spherical aberration must be corrected by increasing the number of lens elements composing the relay lens system (the fourth lens unit), but such a correcting measure will make it impossible to design a zoom lens system which is compact as a whole.

The Embodiment 4 is a zoom lens system which has an F number or an aperture ratio reduced or enhanced without increasing the number of lens elements or prolonging total length of the zoom lens system, and uses for this purpose a radial GRIN lens element having negative refractive powers of surface and medium respectively in the fourth lens unit.

When an attempt is made to design a zoom lens system such as the Embodiment 4 so as to have a high aperture ratio thereof, spherical aberration is undercorrected in the range from the wide position to the tele position. This tendency of undercorrection is remarkable at the tele position and correction of such undercorrected spherical aberration poses a problem in designing a zoom lens system of this type.

In the Embodiment 4, a radial GRIN lens element having a negative refractive power of medium is used as a negative lens element in the fourth positive lens unit and the spherical aberration in the range from the wide position to the tele position is corrected by producing positive spherical aberration by the surface of the radial GRIN lens element. Further, in order to correct the longitudinal chromatic aberration independently by the fourth positive lens unit, large Abbe's numbers are selected for the positive lens elements and small Abbe's numbers are chosen for the negative lens elements in contrast to the case of the Embodiment 3. In other words, the positive longitudinal chromatic aberration produced by the positive refractive powers is cancelled by producing negative longitudinal chromatic aberration with the negative lens elements. Since the radial GRIN lens element used in the Embodiment 4 is designed so as to satisfy the condition (2), it is sufficient for producing the negative longitudinal chromatic aberration to design the refractive powers of surface and medium so as to have the same sign as is judged from the formula of longitudinal chromatic aberration. Accordingly, it is desirable that the radial GRIN lens element satisfies the condition (8) also in the Embodiment 4 as in the case of the Embodiment 3.

If the lower limit of the condition (8) is exceeded, the refractive power of surface will have a sign which is reverse to the sign of the refractive power of medium, thereby making it impossible to effectively correct the longitudinal chromatic aberration.

As is understood from the foregoing description, the negative Petzval's sum is reduced by using, as a negative lens element, the radial GRIN lens element having the negative refractive power of medium and the zoom lens system as a whole produces Petzval's sum on the positive side. However, a zoom lens system having a high vari-focal ratio has a tendency to allow Petzval's sum to be produced on the negative side especially at the tele position. Therefore, use of the above-described radial GRIN lens element makes it possible to correct Petzval's sum in the zoom lens system as a whole or maintain Petzval's sum at a favorable level in the zoom lens system as a whole.

As is understood from the foregoing description, the Embodiment 4 corrects the spherical aberration, which is apt to be undercorrected, by producing positive spherical aberration due to the refractive index distribution formed on the surface of the radial GRIN lens element having the negative refractive power of surface which is used as a negative lens element in the fourth positive lens unit, and further favorably corrects the longitudinal chromatic aberration, which is apt to be produced on the positive side, by producing negative longitudinal chromatic aberration with the medium of the radial GRIN lens element satisfying the conditions (2) and (8). As a result, the Embodiment 4 is designed as a zoom lens system having an F number or an aperture ratio reduced or enhanced without increasing the number of lens elements nor prolonging total length of the zoom lens system as a whole.

Now, numerical data of the Embodiments 1 through 4 of the present invention will be described below:

Embodiment 1
$f = 9 \sim 27$ mm,  F/2.8
$2\omega = 50.0° \sim 17.7°$ $r_1 = 22.6076$
$d_1 = 4.9781$  $n_{01}$ (GRIN lens)
$r_2 = -436.2224$
$d_2 = D_1$ (variable)
$r_3 = 29.3077$
$d_3 = 0.7750$  $n_{02} = 1.69700$  $\nu_{02} = 48.51$
$r_4 = 7.7228$
$d_4 = 3.4004$
$r_5 = -14.5061$
$d_5 = 0.8000$  $n_{03} = 1.69680$  $\nu_{03} = 55.52$
$r_6 = 27.6375$
$d_6 = D_2$ (variable)
$r_7 = 17.9053$
$d_7 = 1.6006$  $n_{04} = 1.85026$  $\nu_{04} = 32.28$
$r_8 = \infty$
$d_8 = D_3$ (variable)
$r_9 = \infty$ (stop)
$d_9 = 0.7011$
$r_{10} = 9.7317$
$d_{10} = 4.0018$  $n_{05} = 1.74950$  $\nu_{05} = 35.27$
$r_{11} = -30.7988$
$d_{11} = 0.9808$
$r_{12} = -11.1808$
$d_{12} = 1.5488$  $n_{06} = 1.84666$  $\nu_{06} = 23.78$
$r_{13} = 12.2735$
$d_{13} = 2.0131$
$r_{14} = 83.7015$
$d_{14} = 2.7001$  $n_{07} = 1.69680$  $\nu_{07} = 55.52$
$r_{15} = -12.5269$
$d_{15} = 0.1001$
$r_{16} = 25.4098$
$d_{16} = 2.0046$  $n_{08} = 1.69680$  $\nu_{08} = 55.52$
$r_{17} = -45.6802$
$d_{17} = D_4$ (variable)

-continued $r_{18} = \infty$
$d_{18} = 7.9000$  $n_{09} = 1.51633$  $\nu_{09} = 64.15$
$r_{19} = \infty$
$d_{19} = 1.0000$  $n_{010} = 1.51633$  $\nu_{010} = 64.15$
$r_{20} = \infty$
$d_{20} = 5.1000$  $n_{011} = 1.54771$  $\nu_{011} = 62.83$
$r_{21} = \infty$
$d_{21} = 0.9000$
$r_{22} = \infty$
$d_{22} = 0.7000$  $n_{012} = 1.51633$  $\nu_{012} = 64.15$
$r_{23} = \infty$
$d_{23} = 0.3100$
$r_{24} = \infty$
$d_{24} = 0.6000$  $n_{013} = 1.48749$  $\nu_{013} = 70.20$
$r_{25} = \infty$

| f | 9 | 18 | 27 (mm) |
|---|---|----|---------|
| $D_1$ | 0.600 | 7.063 | 10.841 |
| $D_2$ | 4.509 | 1.255 | 0.601 |
| $D_3$ | 11.364 | 4.423 | 0.607 |
| $D_4$ | 1.964 | 5.697 | 6.390 |

GRIN lens
(d line)
$n_0 = 1.65160$,  $n_1 = 0.49186 \times 10^{-4}$
$n_2 = 0.80336 \times 10^{-6}$,  $n_3 = 0.12008 \times 10^{-7}$
(C line)
$n_0 = 1.64821$,  $n_1 = 0.47711 \times 10^{-4}$
$n_2 = 0.77926 \times 10^{-6}$,  $n_3 = 0.11648 \times 10^{-7}$
(F line)
$n_0 = 1.65934$,  $n_1 = 0.52629 \times 10^{-4}$
$n_2 = 0.85960 \times 10^{-6}$,  $n_3 = 0.12849 \times 10^{-7}$
$\nu_{1d} = 10.0$,  $\phi_S \times \phi_M = -0.148 \times 10^{-4}$
$d_G/f_W = 0.553$,  $n_{1d} \cdot f_W^2 = 0.398 \times 10^{-2}$

Embodiment 2
$f = 35$ mm,  F/2.0,  $2\omega = 63.3°$ $r_1 = 42.5608$
$d_1 = 2.8931$  $n_{01}$ (GRIN lens)
$r_2 = 16.0000$
$d_2 = 11.2628$
$r_3 = 30.4147$
$d_3 = 9.5110$  $n_{02} = 1.80440$  $\nu_{02} = 39.58$
$r_4 = -16.3107$
$d_4 = 1.8137$  $n_{03} = 1.68893$  $\nu_{03} = 31.08$
$r_5 = -148.2873$
$d_5 = 1.4830$
$r_6 = \infty$ (stop)
$d_6 = 4.4965$
$r_7 = -18.5928$
$d_7 = 4.5598$  $n_{04} = 1.76182$  $\nu_{04} = 26.52$
$r_8 = 72.4994$
$d_8 = 1.5059$
$r_9 = -91.6156$
$d_9 = 3.0843$  $n_{05} = 1.75700$  $\nu_{05} = 47.87$
$r_{10} = -18.4586$
$d_{10} = 0.1000$
$r_{11} = 176.1595$
$d_{11} = 1.8590$  $n_{06} = 1.75700$  $\nu_{06} = 47.87$
$r_{12} = -65.2844$ GRIN lens
(d line)
$n_0 = 1.60311$,  $n_1 = -0.33262 \times 10^{-3}$
$n_2 = 0.16532 \times 10^{-5}$,  $n_3 = -0.36645 \times 10^{-8}$
(C line)
$n_0 = 1.60008$,  $n_1 = -0.32763 \times 10^{-3}$
$n_2 = 0.16284 \times 10^{-5}$,  $n_3 = -0.36095 \times 10^{-8}$
(F line)
$n_0 = 1.61002$,  $n_1 = -0.34426 \times 10^{-3}$
$n_2 = 0.17111 \times 10^{-5}$,  $n_3 = -0.37928 \times 10^{-8}$
$\nu_{1d} = 20.0$,  $\phi_S \times \phi_M = -0.434 \times 10^{-4}$
$r_1/f = 0.457$

Embodiment 3
$f = 8 \sim 56$ mm,  F/1.2~F/1.4
$2\omega = 53.1° \sim 8.2°$ $r_1 = 82.5724$
$d_1 = 1.4143$  $n_{01} = 1.80518$  $\nu_{01} = 25.43$
$r_2 = 38.6126$
$d_2 = 7.1207$  $n_{02} = 1.60311$  $\nu_{02} = 60.70$ -continued

| | | | |
|---|---|---|---|
| $r_3 = -205.7685$ | | | |
| | $d_3 = 0.1000$ | | |
| $r_4 = 34.6038$ | | | |
| | $d_4 = 5.1257$ | $n_{03} = 1.60311$ | $\nu_{03} = 60.70$ |
| $r_5 = 137.9357$ | | | |
| | $d_5 = D_1$ (variable) | | |
| $r_6 = 827.7406$ | | | |
| | $d_6 = 1.0715$ | $n_{04} = 1.77250$ | $\nu_{04} = 49.66$ |
| $r_7 = 15.2335$ | | | |
| | $d_7 = 3.5929$ | | |
| $r_8 = -37.2252$ | | | |
| | $d_8 = 0.9968$ | $n_{05} = 1.69680$ | $\nu_{05} = 55.52$ |
| $r_9 = 15.0046$ | | | |
| | $d_9 = 3.2449$ | $n_{06}$ (GRIN lens) | |
| $r_{10} = 130.1000$ | | | |
| | $d_{10} = D_2$ (variable) | | |
| $r_{11} = -17.7121$ | | | |
| | $d_{11} = 0.9693$ | $n_{07} = 1.70154$ | $\nu_{07} = 41.21$ |
| $r_{12} = -272.4497$ | | | |
| | $d_{12} = D_3$ (variable) | | |
| $r_{13} = 142.0713$ | | | |
| | $d_{13} = 2.6797$ | $n_{08} = 1.77250$ | $\nu_{08} = 49.66$ |
| $r_{14} = -34.8054$ | | | |
| | $d_{14} = 0.1162$ | | |
| $r_{15} = \infty$ | | | |
| | $d_{15} = 9.0000$ | $n_{09} = 1.51633$ | $\nu_{09} = 64.15$ |
| $r_{16} = \infty$ | | | |
| | $d_{16} = 2.3000$ | | |
| $r_{17} = \infty$ (stop) | | | |
| | $d_{17} = 2.3808$ | | |
| $r_{18} = 52.5312$ | | | |
| | $d_{18} = 3.6290$ | $n_{010} = 1.69680$ | $\nu_{010} = 55.52$ |
| $r_{19} = -52.1216$ | | | |
| | $d_{19} = 0.1217$ | | |
| $r_{20} = 27.6567$ | | | |
| | $d_{20} = 2.8838$ | $n_{011} = 1.69680$ | $\nu_{011} = 55.52$ |
| $r_{21} = 232.2327$ | | | |
| | $d_{21} = 1.6887$ | | |
| $r_{22} = -38.3728$ | | | |
| | $d_{22} = 1.2538$ | $n_{012} = 1.78472$ | $\nu_{012} = 25.68$ |
| $r_{23} = -285.6911$ | | | |
| | $d_{23} = 8.7950$ | | |
| $r_{24} = -796.4295$ | | | |
| | $d_{24} = 1.1534$ | $n_{013} = 1.78472$ | $\nu_{013} = 25.68$ |
| $r_{25} = 34.6547$ | | | |
| | $d_{25} = 1.8006$ | | |
| $r_{26} = 111.5097$ | | | |
| | $d_{26} = 1.1449$ | $n_{014} = 1.78472$ | $\nu_{014} = 25.68$ |
| $r_{27} = 28.0593$ | | | |
| | $d_{27} = 1.1302$ | | |
| $r_{28} = 123.6443$ | | | |
| | $d_{28} = 3.2185$ | $n_{015} = 1.71300$ | $\nu_{015} = 53.84$ |
| $r_{29} = -21.6307$ | | | |
| | $d_{29} = 0.1432$ | | |
| $r_{30} = 17.2534$ | | | |
| | $d_{30} = 3.0079$ | $n_{016} = 1.71300$ | $\nu_{016} = 53.84$ |
| $r_{31} = 118.5841$ | | | |
| | $d_{31} = 2.9276$ | | |
| $r_{32} = \infty$ | | | |
| | $d_{32} = 7.3000$ | $n_{017} = 1.51633$ | $\nu_{017} = 64.15$ |
| $r_{33} = \infty$ | | | |

| f | 8.0 | 22.0 | 56.0 (mm) |
|---|---|---|---|
| $D_1$ | 1.363 | 17.613 | 25.970 |
| $D_2$ | 24.038 | 7.432 | 4.973 |
| $D_3$ | 5.808 | 6.164 | 0.265 |

GRIN lens (d line)
$n_0 = 1.84666$, $n_1 = -0.38951 \times 10^{-4}$
$n_2 = -0.64172 \times 10^{-6}$, $n_3 = -0.11602 \times 10^{-7}$
(C line)
$n_0 = 1.83649$, $n_1 = -0.38367 \times 10^{-4}$
$n_2 = -0.63209 \times 10^{-6}$, $n_3 = -0.11428 \times 10^{-7}$
(F line)
$n_0 = 1.87210$, $n_1 = -0.40314 \times 10^{-4}$
$n_2 = -0.66418 \times 10^{-6}$, $n_3 = -0.12008 \times 10^{-7}$
$\nu_{1d} = 20.0$, $\phi_S \times \phi_M = 0.128 \times 10^{-4}$ -continued Embodiment 4
f = 9~27 mm, F/1.8
2ω = 50.0°~17.7°

| | | | |
|---|---|---|---|
| $r_1 = 18.4298$ | | | |
| | $d_1 = 1.3803$ | $n_{01} = 1.84666$ | $\nu_{01} = 23.78$ |
| $r_2 = 15.9550$ | | | |
| | $d_2 = 1.4924$ | | |
| $r_3 = 22.2822$ | | | |
| | $d_3 = 4.4022$ | $n_{02} = 1.69680$ | $\nu_{02} = 55.52$ |
| $r_4 = -436.2224$ | | | |
| | $d_4 = D_1$ (variable) | | |
| $r_5 = 24.5429$ | | | |
| | $d_5 = 0.8017$ | $n_{03} = 1.69680$ | $\nu_{03} = 55.52$ |
| $r_6 = 8.4049$ | | | |
| | $d_6 = 3.4908$ | | |
| $r_7 = -15.0477$ | | | |
| | $d_7 = 0.8000$ | $n_{04} = 1.69680$ | $\nu_{04} = 55.52$ |
| $r_8 = 20.7215$ | | | |
| | $d_8 = D_2$ (variable) | | |
| $r_9 = 18.3996$ | | | |
| | $d_9 = 1.8004$ | $n_{05} = 1.84666$ | $\nu_{05} = 23.78$ |
| $r_{10} = \infty$ | | | |
| | $d_{10} = D_3$ (variable) | | |
| $r_{11} = \infty$ (stop) | | | |
| | $d_{11} = 1.0004$ | | |
| $r_{12} = 9.7248$ | | | |
| | $d_{12} = 4.3737$ | $n_{06} = 1.74950$ | $\nu_{06} = 35.27$ |
| $r_{13} = -29.9599$ | | | |
| | $d_{13} = 0.9808$ | | |
| $r_{14} = -12.4767$ | | | |
| | $d_{14} = 1.0000$ | $n_{07}$ (GRIN lens) | |
| $r_{15} = 11.9126$ | | | |
| | $d_{15} = 2.6141$ | | |
| $r_{16} = 100.4302$ | | | |
| | $d_{16} = 3.1076$ | $n_{08} = 1.69680$ | $\nu_{08} = 55.52$ |
| $r_{17} = -9.5110$ | | | |
| | $d_{17} = 0.1500$ | | |
| $r_{18} = 15.5598$ | | | |
| | $d_{18} = 1.8056$ | $n_{09} = 1.69680$ | $\nu_{09} = 55.52$ |
| $r_{19} = 30.3436$ | | | |
| | $d_{19} = D_4$ (variable) | | |
| $r_{20} = \infty$ | | | |
| | $d_{20} = 7.9000$ | $n_{010} = 1.51633$ | $\nu_{010} = 64.15$ |
| $r_{21} = \infty$ | | | |
| | $d_{21} = 1.0000$ | $n_{011} = 1.51633$ | $\nu_{011} = 64.15$ |
| $r_{22} = \infty$ | | | |
| | $d_{22} = 5.1000$ | $n_{012} = 1.54771$ | $\nu_{012} = 62.83$ |
| $r_{23} = \infty$ | | | |
| | $d_{23} = 0.9000$ | | |
| $r_{24} = \infty$ | | | |
| | $d_{24} = 0.7000$ | $n_{013} = 1.51633$ | $\nu_{013} = 64.15$ |
| $r_{25} = \infty$ | | | |
| | $d_{25} = 0.3100$ | | |
| $r_{26} = \infty$ | | | |
| | $d_{26} = 0.6000$ | $n_{014} = 1.48749$ | $\nu_{014} = 70.20$ |
| $r_{27} = \infty$ | | | |

| f | 9 | 18 | 27 (mm) |
|---|---|---|---|
| $D_1$ | 0.600 | 8.338 | 12.852 |
| $D_2$ | 2.841 | 0.908 | 0.693 |
| $D_3$ | 13.565 | 5.099 | 0.800 |
| $D_4$ | 2.439 | 5.100 | 5.100 |

GRIN lens (d line)
$n_0 = 1.84666$, $n_1 = 0.25334 \times 10^{-2}$
$n_2 = -0.12212 \times 10^{-4}$, $n_3 = -0.78528 \times 10^{-6}$
(C line)
$n_0 = 1.83649$, $n_1 = 0.24586 \times 10^{-2}$
$n_2 = -0.98114 \times 10^{-5}$, $n_3 = -0.80891 \times 10^{-6}$
(F line)
$n_0 = 1.87210$, $n_1 = 0.27079 \times 10^{-2}$
$n_2 = -0.17820 \times 10^{-4}$, $n_3 = -0.73013 \times 10^{-6}$
$\nu_{1d} = 10.2$, $\phi_S \times \phi_M = 0.717 \times 10^{-3}$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's numbers of the respective lens elements.

Figure 7:
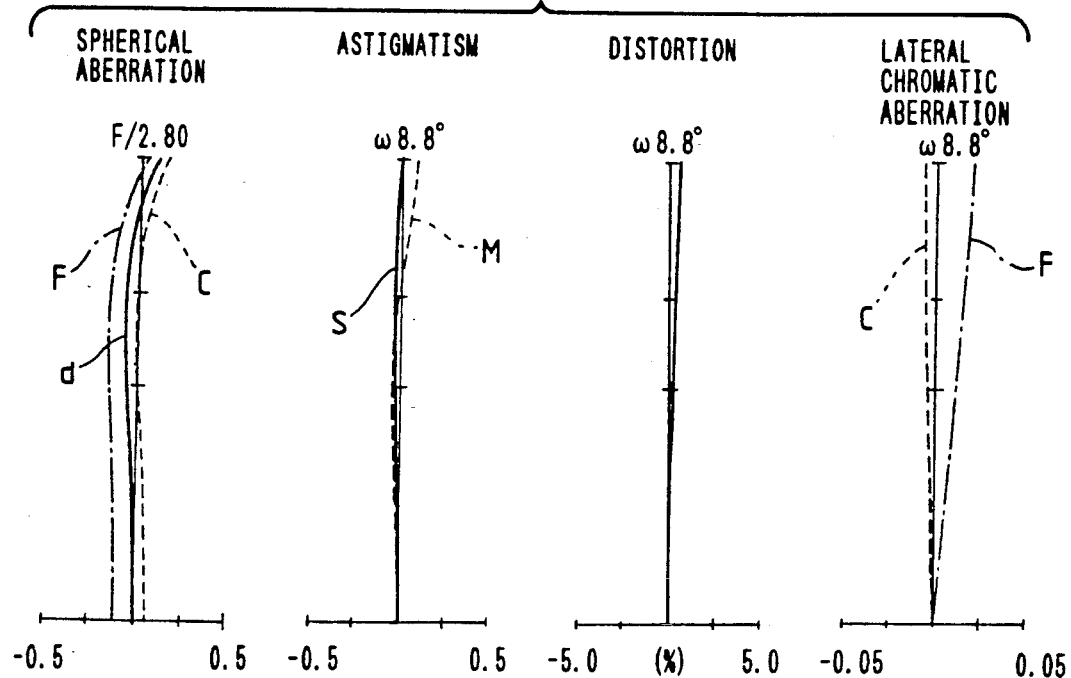

Aberration characteristics at the wide position, intermediate focal length and tele position of the Embodiment 1 are illustrated in FIG. 5, FIG. 6 and FIG. 7 respectively.

Figure 8:
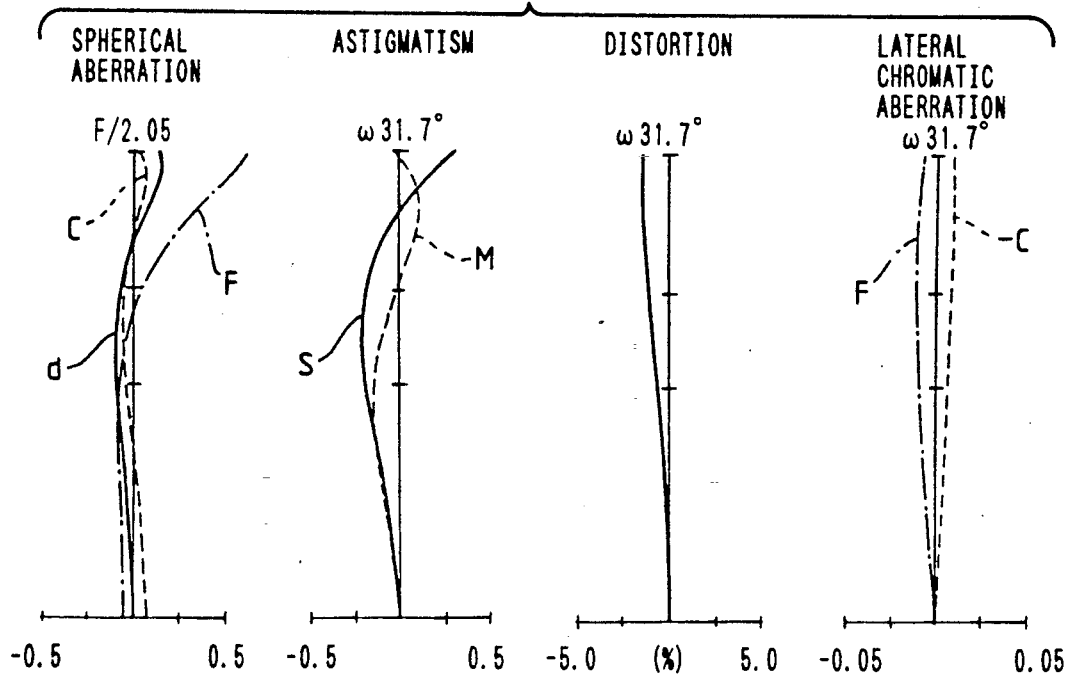
FIG. 8 shows curves illustrating aberration characteristics of the Embodiment 2 of the present invention.

Aberration characteristics of the Embodiment 2 are visualized in FIG. 8.

Figure 9:
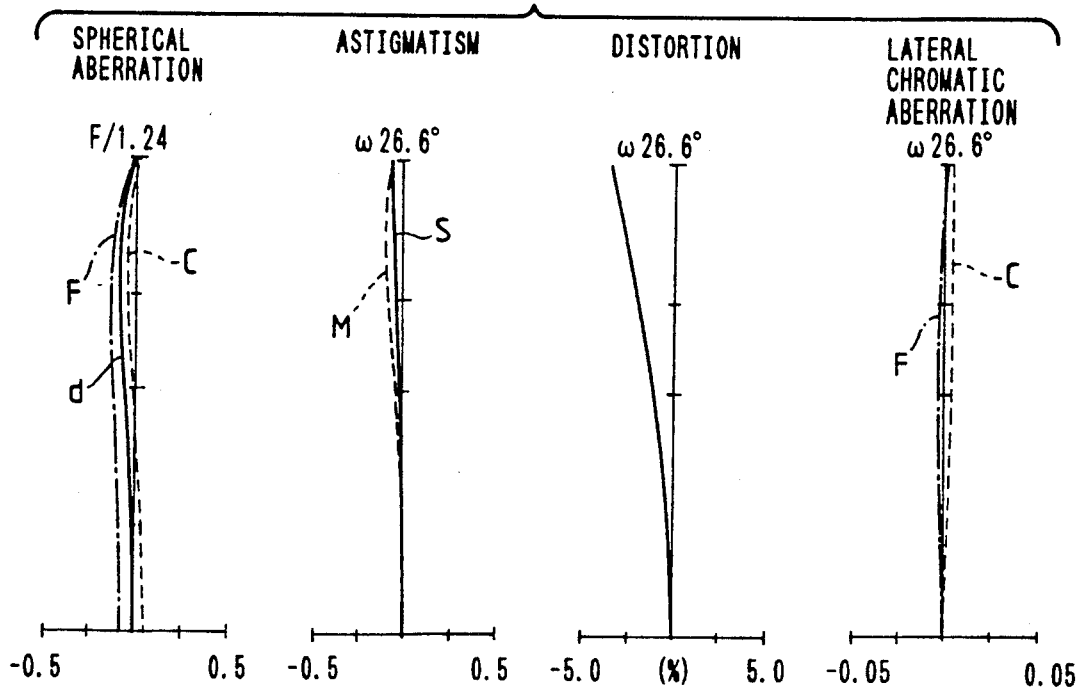
FIG. 9 through FIG. 11 show graphs illustrating aberration characteristics of the Embodiment 3 of the present invention.
Figure 10:
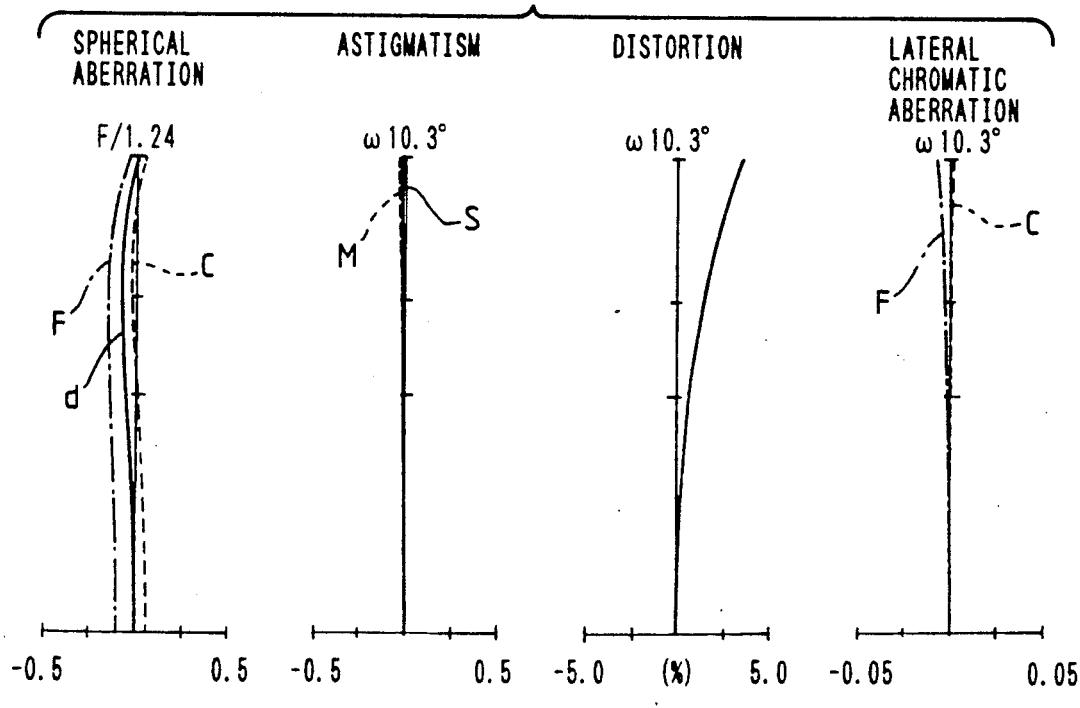
Figure 11:
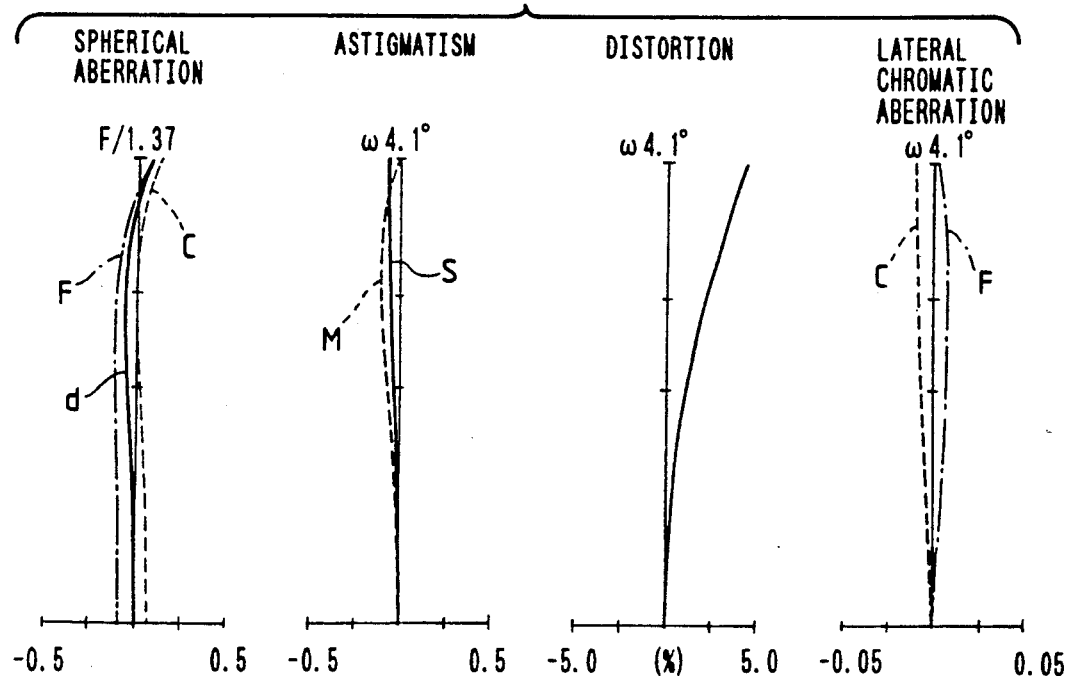

Aberration characteristics at the wide position, intermediate focal length and tele position of the Embodiment 3 are illustrated in FIG. 9, FIG. 10 and FIG. 11 respectively.

Figure 12:
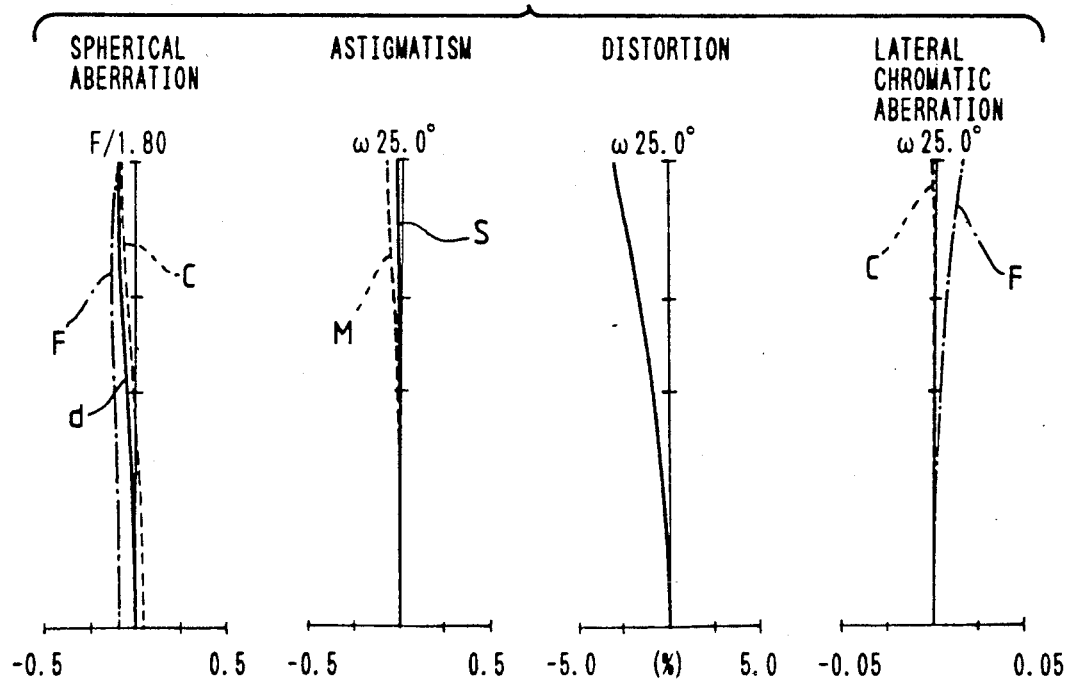
FIG. 12 through FIG. 14 show graphs illustrating aberration characteristics of the Embodiment 4 of the present invention.
Figure 13:
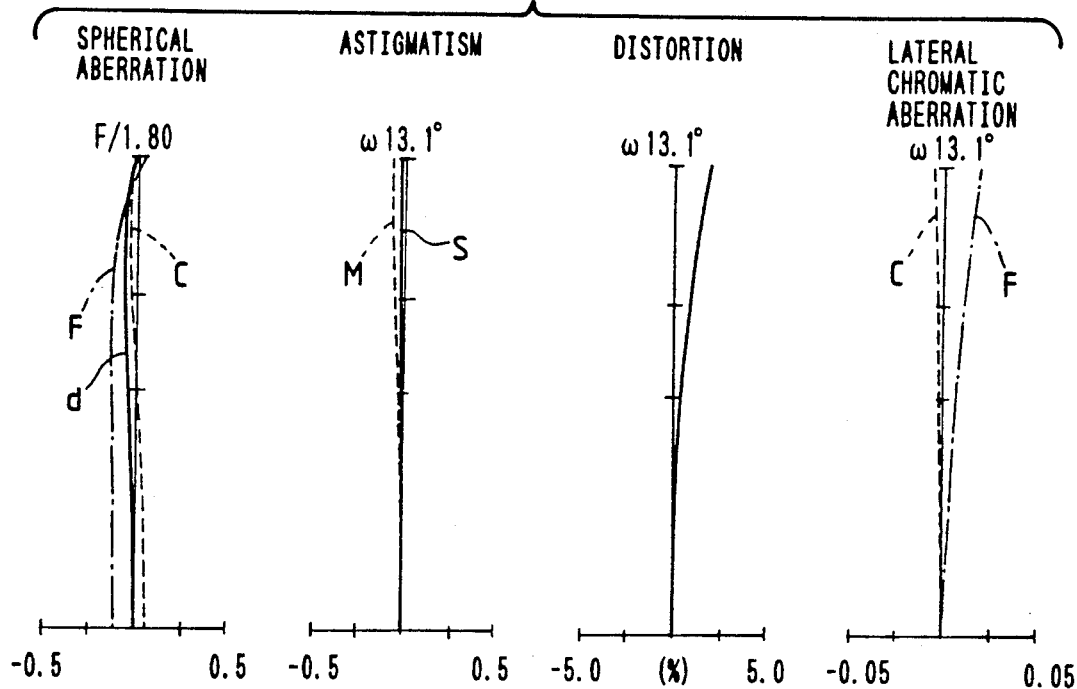
Figure 14:
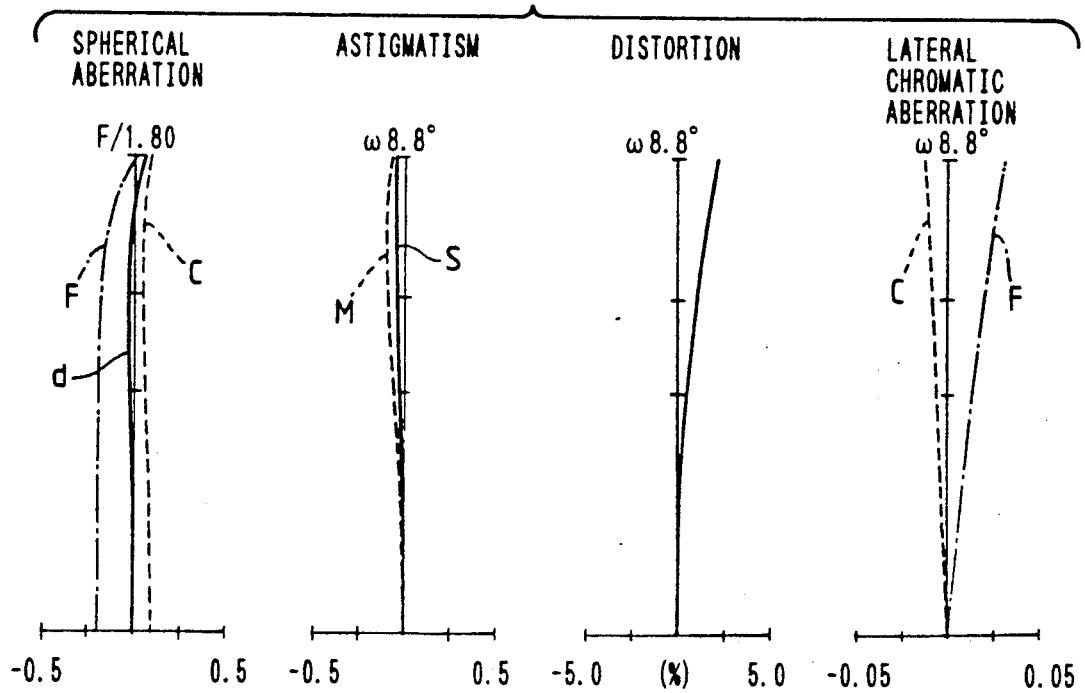

Aberration characteristics at the wide position, intermediate focal length and tele position of the Embodiment 4 are visualized in FIG. 12, FIG. 13 and FIG. 14 respectively.

As is understood from the foregoing description, the optical system according to the present invention comprises a radial GRIN lens element which satisfies the condition (2), and has the above-described refractive power of surface, a refractive power of medium and a refractive power of the radial GRIN lens element as a whole, and is adapted so as to have excellent performance by favorably correcting aberrations in the optical system as a whole by making most of the function of the radial GRIN lens element for correcting Petzval's sum and the longitudinal chromatic aberration.

What is claimed is:

1. An optical system comprising, in the order from the object side:
   at least a first lens unit having a positive refractive power; and
   a second lens unit having a negative refractive power with an airspace between said first and second lens units, said second lens unit and said first lens unit disposed next to one another so that no other lens components are disposed between the first and second lens units;
   wherein said optical system varies focal length thereof by varying the airspace reserved between the first and the second lens unit; and
   wherein said first lens unit includes at least one graded refractive index lens element satisfying the following conditions (1) and (4):

$$n(r) = n_0 + \Sigma n_1 r_1^{2i} \quad (1)$$

$$\Phi_S \cdot \Phi_M < 0 \quad (4)$$

wherein the reference symbol $n_0$ represents the refractive index of said graded refractive index lens element as measured on an optical axis thereof, the reference symbol $r$ designates distance as measured in a radial direction from the optical axis, the reference symbol $n(r)$ denotes the refractive index of said graded refractive index lens element as measured at a distance $r$ from the optical axis, the reference symbols $n_1, n_2, n_3, \ldots$ represent refractive index distribution coefficients of the second, fourth, sixth, ... orders respectively, the reference symbol $\Phi_S$ designates the refractive power of a surface of said graded refractive index lens element, and the reference symbol $\Phi_M$ denotes the refractive power of a medium of said graded refractive index lens element and is expressed as $\Phi_M = -2n_1 d_G$, where $d_G$ is the thickness of said graded refractive lens element as measured on the optical axis.

2. A vari-focal lens system having an optical system according to claim 1, wherein said vari-focal lens system further comprises, disposed after said second lens unit:
   a third lens unit having a positive refractive power; and
   a fourth lens unit having a positive refractive power;
   wherein said vari-focal lens system varies focal lengths thereof by moving said second lens unit and said third lens unit along the optical axis.

3. A vari-focal lens system according to claim 1 wherein said first lens unit is composed only of a single lens element.

4. A vari-focal lens system according to claim 3, wherein said graded refractive index lens element has a shape thicker at the portion thereof on the optical axis than at the marginal portion thereof.

5. A vari-focal lens system according to claim 1 satisfying the following conditions (5) and (6):

$$5 \times 10^{-2} < d_G/f_W \quad (5)$$

$$0 < n_1 \cdot f_W^2 < 5 \quad (6)$$

wherein the reference symbol $d_G$ represents thickness of said graded refractive index lens element as measured on the optical axis, the reference symbol $f_W$ designates the shortest focal length of said vari-focal lens system.

6. An optical system according to claim 1, further satisfying the following condition (3):

$$\nu_{1d} < \nu_{0d} \quad (3)$$

wherein the reference symbol $\nu_{0d}$ represents an Abbe's number determined from refractive indices for the d-line, F-line and C-line as measured on the optical axis and the reference symbol $\nu_{1d}$ represents a value determined by the following formula when the coefficients of the second order for the d-line, F-line and C-line are represented by $n_{1d}$, $n_{1F}$ and $n_{1c}$ respectively:

$$\nu_{1d} = n_{1d}/(n_{1F} - n_{1C}).$$

7. An optical system according to claim 1, wherein said graded refractive index lens element has a positive refractive power of surface, a negative refractive power of medium and a positive refractive power as a whole.

* * * * *